United States Patent
Wallmeier et al.

(10) Patent No.: US 7,640,273 B2
(45) Date of Patent: Dec. 29, 2009

(54) BUSINESS INTELLIGENCE DATA RECONCILIATION SYSTEM

(75) Inventors: Reiner Wallmeier, Wiesloch (DE); Jens Breyer, Heidelberg (DE); Christian Cramer, Eggenstein-Leopoldshafen (DE)

(73) Assignee: SAP AG, Walldorf (DE)

( * ) Notice: Subject to any disclaimer, the term of this patent is extended or adjusted under 35 U.S.C. 154(b) by 300 days.

(21) Appl. No.: 11/517,711

(22) Filed: Sep. 8, 2006

(65) Prior Publication Data

US 2008/0065629 A1    Mar. 13, 2008

(51) Int. Cl.
G06Q 30/00 (2006.01)
G06Q 40/00 (2006.01)
G06F 17/30 (2006.01)
G06F 17/00 (2006.01)

(52) U.S. Cl. .......... 707/200; 707/104.1; 705/50; 705/1; 705/30; 705/35; 705/40

(58) Field of Classification Search .......... 707/6, 707/10, 201, 203, 3; 198/502.3; 380/279; 382/135, 137; 703/1; 705/26, 27, 30, 35, 705/37, 41, 54; 713/175, 187
See application file for complete search history.

(56) References Cited

U.S. PATENT DOCUMENTS

| | | | | |
|---|---|---|---|---|
| 5,684,990 | A * | 11/1997 | Boothby | 707/203 |
| 5,689,579 | A * | 11/1997 | Josephson | 382/137 |
| 5,832,489 | A * | 11/1998 | Kucala | 707/10 |
| 5,893,904 | A * | 4/1999 | Harris et al. | 705/27 |
| 6,442,690 | B1 * | 8/2002 | Howard et al. | 713/175 |
| 2001/0014893 | A1 * | 8/2001 | Boothby | 707/201 |
| 2001/0026619 | A1 * | 10/2001 | Howard et al. | 380/279 |
| 2002/0002538 | A1 * | 1/2002 | Ling | 705/41 |
| 2002/0035450 | A1 * | 3/2002 | Thackston | 703/1 |
| 2002/0049660 | A1 * | 4/2002 | Obrador et al. | 705/37 |
| 2002/0175049 | A1 * | 11/2002 | Flores | 198/502.3 |
| 2003/0028529 | A1 * | 2/2003 | Cheung et al. | 707/3 |
| 2003/0059098 | A1 * | 3/2003 | Jones et al. | 382/135 |
| 2003/0070080 | A1 * | 4/2003 | Rosen | 713/187 |
| 2003/0212609 | A1 * | 11/2003 | Blair et al. | 705/26 |
| 2004/0083149 | A1 * | 4/2004 | Jones | 705/35 |
| 2004/0139018 | A1 * | 7/2004 | Anderson et al. | 705/41 |
| 2005/0177470 | A1 * | 8/2005 | Tandon et al. | 705/30 |

* cited by examiner

*Primary Examiner*—James Trujillo
*Assistant Examiner*—William Spieler
(74) *Attorney, Agent, or Firm*—Kenyon & Kenyon LLP

(57) ABSTRACT

A sending device sends a key and financial data to a receiver device and a reconciliation device in a business intelligence system. The receiver device verifies the key and sends the verified key and financial data to the business intelligence system. The reconciliation device selects the data sets based on the keys and thereupon compares the financial data. If the comparison reveals the data sets as being proper matches, the financial data is considered reconciled and can then be cleared. If not, the non-reconciled data in the data set may be archived for later reconciliation operations at future time intervals or may be resubmitted to the sending device for reevaluation. The inclusion of addition data and an interaction between various financial processing instruments allows for the reconciliation of business intelligence data in a business intelligence application/system.

20 Claims, 4 Drawing Sheets

BUSINESS INTELLIGENCE DATA RECONCILIATION SYSTEM

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to reconciling financial data in financial data processing systems and more specifically to securely reconciling financial data between various financial processing systems using a business intelligence system.

Many financial transactions are electronically processed. As the number of transactions increases and the variety of different parties and their underlying processing systems increases, problems arise with settling these numerous transactions.

Existing financial institutions deal with large numbers of operating or transactional systems. These systems provide account data and other information that may be requested. These systems allow front end user interfaces for performing various financial activities. The front end systems can interact with back end processing systems that perform the computation and further processing of the financial data. Sending this data and reconciling the details of the data in the existing back end system associated with the user interfaces is a very time consume process involving a lot of users checking the correctness of these electronic financial figures.

One type of existing solution is an accounting driven solution. Banking and other financial customers are using accounting software and open item management tools to solve current problems. This solution may solve some underlying accounting issues relating to settling various financial transactions, but includes a significant amount of performance requirements. The accounting software includes numerous processing steps, including the generation of an accounting document, running clearing processes, updating any open processing items, posting account documents, changing accounting totals and archiving accounting documents. The numerous steps and requirements make it difficult for financial institutions to maintain this technique.

Another approach is a check sum driven technique. This technique can be electronically performed in batch operations through a sender and a receiver. A number of transactions between common parties are grouped together. The sender sends its balance of all grouped transaction, based on its internal records. The receiver concurrently sends its balance of all of its grouped transactions, which is also based on the receiver's internal records.

In a settlement device associated with the back end processing system, the balances for each the sender and receiver are compared. If the balances are equal, the grouping of transactions can be assumed to be reconciled, based on the calculated assumption that the grouped transactions for the sender are the same as the grouped transactions for the receiver. Although, this approach requires examination of the grouping as a whole, and in the event the groupings aren't collectively reconciled, the system must individually compare the transactions in the groupings, which can be a very time consuming task. Additionally, this reconciliation is done in the back end systems for each of the different financial processing systems, providing a disjointed settlement procedure between numerous financial systems and does not provide central settlement operations.

One direction of the banking industry is from a purpose-oriented reconciliation, which includes point to point and loans to accounting transactions, to a more industry-oriented information production process for many information requesters. As the finance functions in business intelligence systems become standard, there is a growing need for standard central reconciliation of these financial transactions, which presently does not exist.

DETAILED DESCRIPTION

The inclusion of additional data and an interaction between various financial processing instruments allows for the reconciliation of business intelligence data in a business intelligence application/system. The reconciliation also includes processes for reducing computational overhead when reconciliation does not automatically occur, including various techniques for archiving and/or settling previously non-reconciled transactions.

Figure 1:
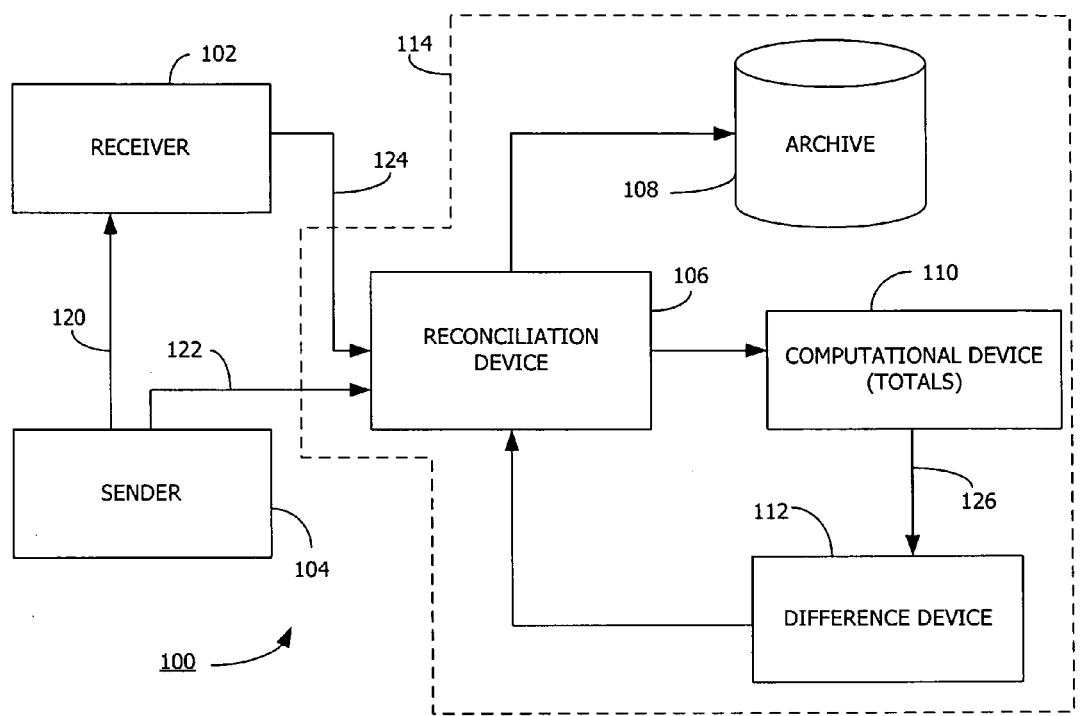
FIG. 1 illustrates one embodiment of a processing system providing for the reconciliation of business intelligence data.

FIG. 1 illustrates one embodiment of a system 100 allowing for the reconciliation of business intelligence data. The system 100 includes a receiver device 102, a sender device 104, a reconciliation device 106, an archival storage device 108, a computation device 110 and a difference device 112.

The business intelligence data may be financial data from one or more financial processing devices or systems, where this financial data is processed by a business intelligence system. The business intelligence system may be composed of one or more processing components, such as the exemplary business intelligence device 114 composed of the reconciliation device 106, storage device 108, computation device 110 and the difference device 112. As recognized by one having ordinary skill in the art, the business intelligence system 114 includes many additional processing components, which have been omitted for clarity purposes only, including additional processing components for performing many of the additional business intelligence processing operations.

The receiver 102 and the sender 104 may be financial processing systems engaging in various financial transactions, such as various parties to a commercial electronic transaction where financial data is processed. This financial data, which may include, among other things, credit and debit notations for one or more various accounts, is processed by the business intelligence system 114.

The reconciliation device 106, computation device 110 and the difference device 112 may be implemented in hardware, software or a combination thereof. In one embodiment, these devices 106, 110 and 112 are implemented through software enabling executable instructions being executed on one or more processing devices. Additionally, the archive storage device 108 may be one or more storage devices. The business intelligence system 114 may be centrally located or in another embodiment may be dispersed through various processing components in operative communication therebetween. Similarly, the receiver 102 and the sender 104 may be remotely disposed relative to the reconciliation device and in communication across a networked connection.

In the system 100 of FIG. 1, the sender 104 and the receiver 102 engage in financial transactions. At specific intervals, the sender 104 and the receiver 102 need to further process the financial data by settling the transactions through the business intelligence system 114. In this embodiment, the sender 104 sends a first key 120 to the receiver device 102, where the key may include hashed or otherwise compressed financial data. The sender 104 also sends financial data 122 to the reconciliation device 106.

The receiver 102 receives the first key 120 and validates this key against an internal key. This technique may use one or more different key verification techniques, including hashing algorithms to include additional data as requested or utilized for verification.

The receiver 102, upon verification of the sender's key 120, transmits a second key and a second set of financial data 124 to the reconciliation device 106. The second key 124, in one embodiment, is the receiver's verified first key 120.

In the reconciliation device 106, the data 122 and 124 are then selected and processed based on the keys. This selection may include finding the incoming data based on the corresponding keys, as one embodiment may include various numbers of senders and receivers in communication with and continuously transmitting various keys and financial data to the business intelligence system 114.

Upon data selection, the computation device compares the first financial data of the first data set and the second financial data of the second data set, where the financial data set includes the financial data received from the sender and receiver devices, and may further include, as discussed below, previously non-reconciled data. The computation device 110 is also referred to as a totals device because in one embodiment, the computation device 110 compares the totals of the financial data of the data sets. As the data sets may include any number of individual transactions, the computation device 110 may also compare the totals.

As the sender 104 and the receiver 102 are opposite parties to the financial transactions of the data sets, the second data set should be, if all accounting figures are proper, the inverse or negative value of the second data set. For example, if the first data set includes a credit for X number of dollars, the second data set should illustrate the opposite side of the transaction, a debit for the same X number of dollars. Therefore, in the computation device 110, a comparison the totals for the data sets may be performed as an efficient processing operation.

In the business intelligence system 114, if the first data set is the inverse of the second data set, the full data sets can be easily reconciled. This reconciliation is accomplished through the utilization of the keys for selecting and verifying the data, thereby improving the processing efficiency of this computational operation. Once the data sets are reconciled, the data sets may then be further processed using known techniques available in the business intelligence system.

In the event the data sets are not equally reconcilable, the difference device 112 allows for the improved efficient processing of the data sets. In the computation device 110, the specific financial data of the data set may be individually compared. This operation provides for the reconciliation of reconcilable data without further processing delays because it is typical that only a small percentage of the financial data is irreconcilable.

The irreconcilable financial data 126 is provided to the difference device 112. This irreconcilable financial data 126, also referred to as uncleared data that has not yet been properly cleared in the business intelligence system, may be stored in the computation device 110 until a predefined period of time. For example, the computation device 110 may provide all the irreconcilable data 126 to the difference device at the end of the processing or business day.

This non reconciled data 126 is then archived, along with the reconciled data. Archiving may be accomplished by providing all of the reconciled and non reconciled data from the computation device 110 to the reconciliation device 106. Through the reconciliation device 106, the data is then stored in the archive storage device 108, where is may be used for accounting purposes, such as an electronic paper trail. In one embodiment, at the predefined time period, which may be at the end of a business day or defined business cycle or period, the reconciliation device 106 may be cleared in preparation for processing the data for the time interval.

In this embodiment, when the next time interval begins, the reconciliation device 106 may retrieve the no-reconciled data from the previous interval for further attempts at reconciliation. This data may include at least a portion of the key data, allowing for further attempts at reconciliation. For example, for any one of many possible processing reasons, financial data in the receiver 102 or the sender 104 may be delayed in being provided to the reconciliation device 106. This delay may cause the financial data to be included in a third data set or a fourth data set of financial data provided from the receiver 102 or the sender 104 at different intervals.

It is also recognized that this process may be repeated for numerous intervals until the financial data can be properly reconciled. As noted above, the computation device 110 may compute the totals for the different data sets and perform the reconciliation, either the data sets as a whole or individually to the financial data when the sets do not reconcile. As non-reconciliation is typically only to a small percentage of the financial data of the data sets, this allows for the reconciling and subsequent processing of the majority of the financial data in an expedited fashion, including the usage of the keys on the front end to better verify and compare proper data sets.

Figure 2:
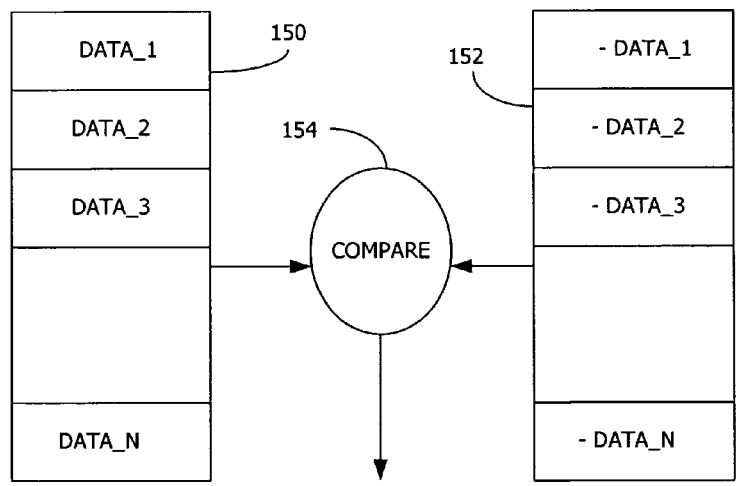
FIG. 2 illustrates one embodiment of a sample data reconciliation operation.

FIG. 2 illustrates a graphical representation of the operations performed by the computation device 110. A comparison device 154 compares a first data set 150 and a second data set 152. This comparison may be performed in the computation device 110 of FIG. 1. The comparison may be performed either on the data set basis, such as comparing the total of the data fields of set 150 with set 152, or if needed the comparison may be done on a per data field basis.

The data sets 150 and 152 each include individual data fields, which may be specific financial transactions. In the illustrated example of FIG. 2, the second data set 152 is the inverse of the first data set 150, where each of the n data fields is the inverse, such as if the data field in the first data set is a debit transaction, the second data set data field corresponds to the credit in the corresponding account. By way of example, this may be similar to a financial transaction for the purchase of a particular item or the payment of an invoice, where funds are electronically transferred and this financial data electronically represents this transaction.

Figure 3:
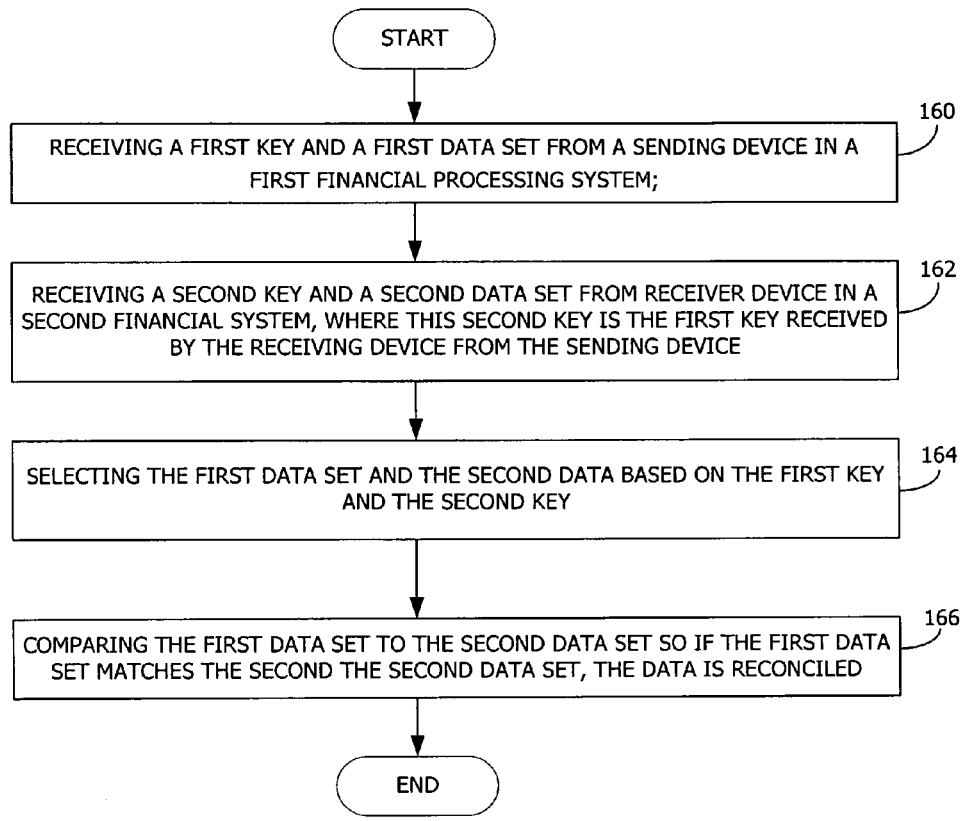
FIG. 3 illustrates a flowchart of the steps of one embodiment of a method for reconciling business intelligence data.

FIG. 3 illustrates a flowchart of the steps of one embodiment of a method for reconciling business intelligence data. In this embodiment, the method begins, step 160, by receiving a first key and a first data set from a sending device in a first financial processing system. With reference to FIG. 1, the first key and the first data set 122 may be received from the sender device 104.

In this embodiment, the next step, step 162, is receiving a second key and a second data set from a receiver device in a second financial system, where the second key is the first key received by the receiving device from the sending device. Again with reference to FIG. 1, the receiving device 102 receives the key 120 from the sender and provides the input 124 to the reconciliation device 106 in the business intelligence system 114.

The next step, step 164, is selecting the first data set and the second data set based on the first key and the second key. These data sets and the keys may be temporarily stored in the reconciliation device 106 and thereupon selected by either the computation device or the reconciliation device itself. This step uses the keys to help in the data selection process, thereby improving system efficiency for processing the received financial data sets.

The next step, step 166, is comparing the first data set to the second data set so that if the first data set matches the second data set, the data is reconciled. In this embodiment, the reconciling is performed inside the business intelligence system. Thereupon, in this embodiment, the method is complete.

Although, additional embodiments may include steps in the event the data sets are not properly reconciled. Another step may include comparing the financial data of the first data set to the second data set and reconciling the matching financial data. The non-matching, non-reconciled data is accordingly designated and archived for further attempts at reconciliation. At further defined time intervals, new financial data and data sets are received in the business intelligence device. The archived non-reconciled data is compared against the data in these new data sets. This process may be repeated until the financial data is settled between the first and second device, which in the above discussion of FIG. 1, were referred to as the sender and receiver, respectively.

Figure 4:
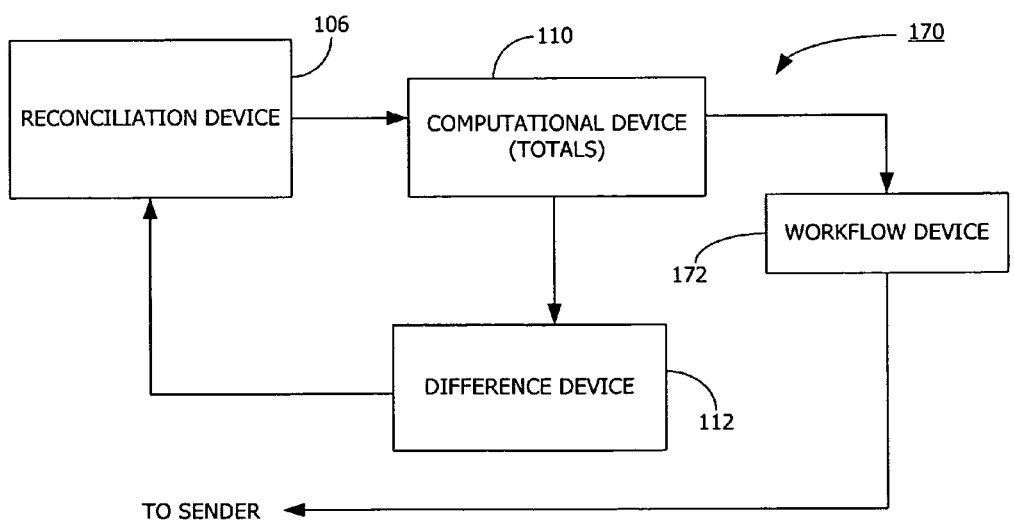
FIG. 4 illustrates another embodiment of a processing system for providing the reconciliation of business intelligence data.

FIG. 4 illustrates another embodiment of a system or apparatus providing for the reconciliation of business intelligence data. The system includes the reconciliation device 106, the computation device 110 and the difference device 112 as described above in the system of FIG. 1. Although, the embodiment of FIG. 4 further includes a workflow device 172, which may be a processing device including executable instructions for performing one or more workflow tasks based on reconciliation tasks performed by the computation device 110. The system of FIG. 4 may be disposed within a business intelligence system In the embodiment of FIG. 1, the non-reconciled data was processed through the difference device 112 for subsequent temporary storage and reprocessing through the reconciliation device 106. The embodiment of FIG. 4 includes the additional option of directing non-reconciled data back through the sender (not illustrated). The computation device 110 may, for example, re-circulate non-reconciled financial data through the reconciliation device 106 for a set number of time intervals, but after that set number of times, further consultation with the sender device may be required to settle the data.

Figure 5:
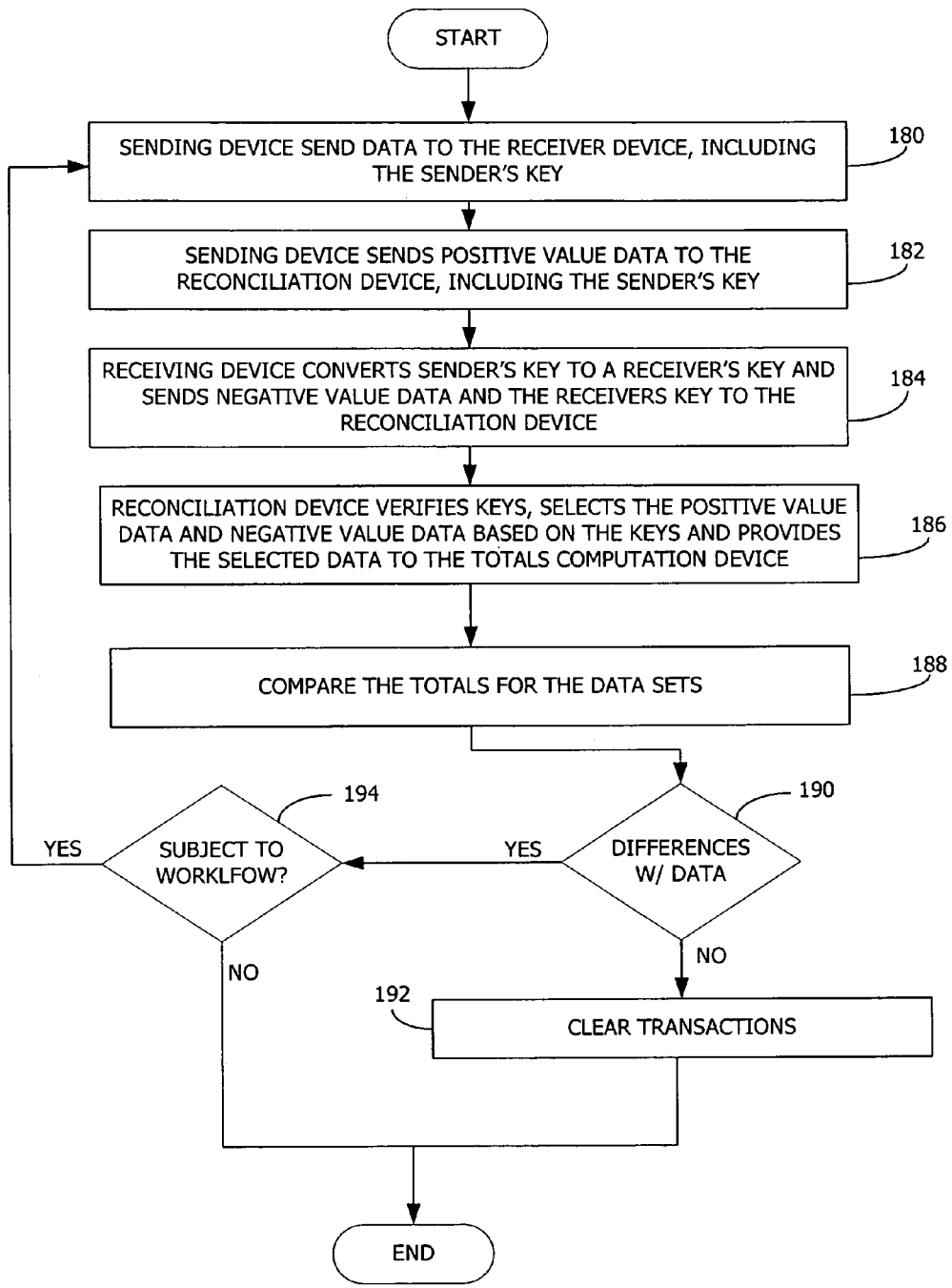
FIG. 5 illustrates a flowchart of the steps of another embodiment of a method for reconciling business intelligence data.

For further discussion of the embodiment of FIG. 4, FIG. 5 illustrates a flowchart of the steps of one embodiment of a method for reconciling business data. As many financial transactions are partitioned by defined time periods, for example charging interest on a line of credit or generating account statements for different periods, the flowchart describes one embodiment of the operation of the business intelligence system, relative to a defined time period, such as a business day.

In this embodiment, the first step is a sending device sending data to the receiver device, this data includes the sender's key, step 180. The next step, step 182, is the sending device sending positive value data to the reconciliation device, including the sender's key. The next step, step 184 includes the receiving device converting the sender's key to a receiver's key and sending negative value data and the receiver's key to the reconciliation device. The steps 180, 182 and 184 are similar to step 160 and 162 in the flowchart of FIG. 3.

The next step, step 186 is the reconciliation device verifying the keys, selecting the positive value and the negative value data based on the keys and providing the selected data to the total computation device. Step 188 is to compare the totals for the data sets. In decision step 190, if there are not any differences with the data, then the data can be reconciled and the transactions settled by the business intelligence system, step 192. Thereupon, in this embodiment, the method is complete.

Although, if the differences cannot be settled, the next step, step 194, is determining if the non-reconciled data is subject to a workflow operation. If yes, the data being subject to the workflow operation is provided back to the sender device. Within the sender device, which is a financial processing system, the data may be reprocessed and subsequently resent to the receiver device and the reconciliation device, therefore the flow reverts back to step 180. Thereupon, in this embodiment, the method is complete.

Figure 6:
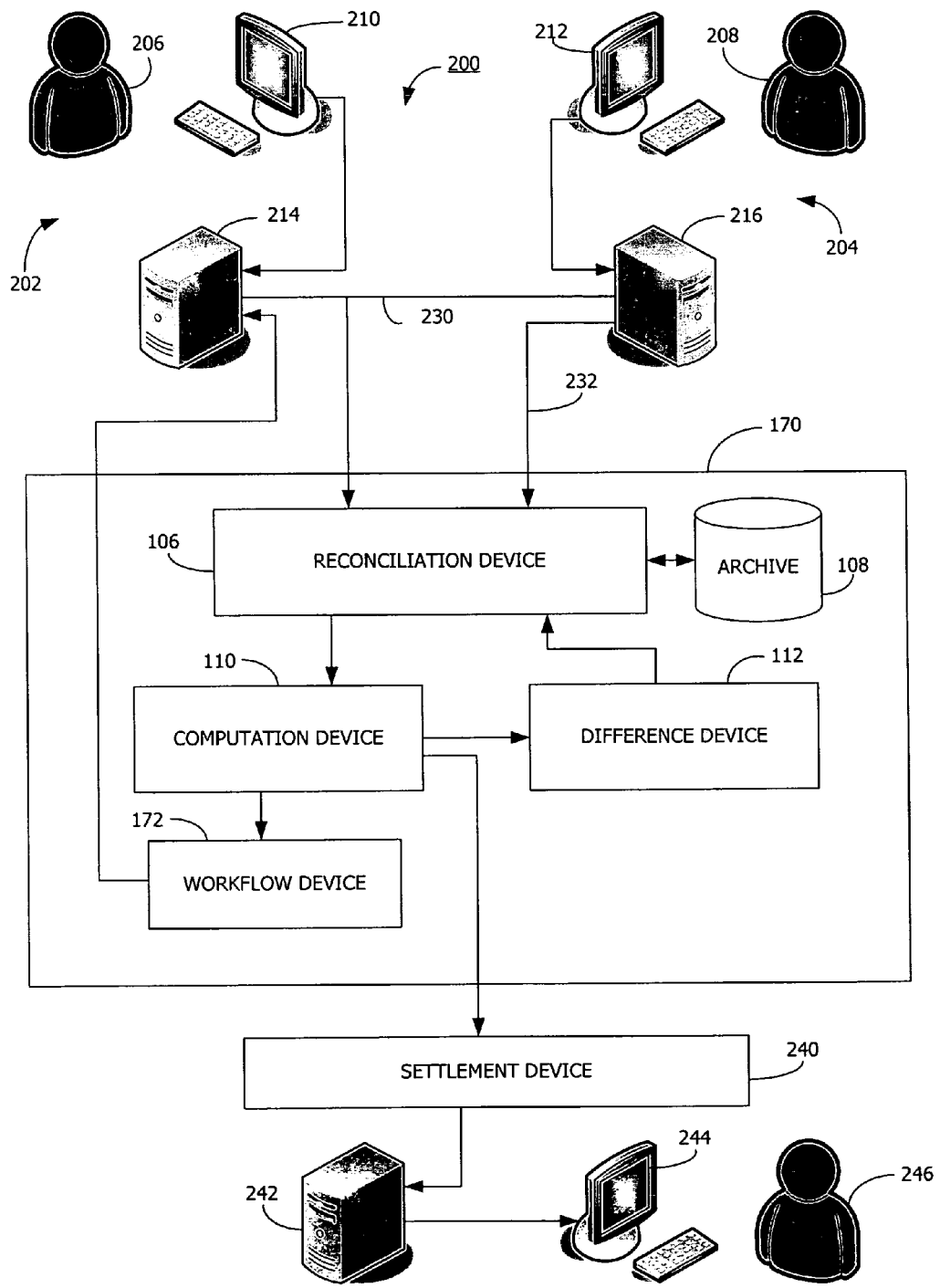
FIG. 6 illustrates a financial processing environment including one embodiment of an apparatus allowing for the reconciliation of business intelligence data.

FIG. 6 illustrates a processing system 200 including a first financial processing system 202 and the second financial processing system 204. Both these systems include users 206, 208, with input terminals 210, 212 and servers 214, 216, respectively. These systems allow the users 206 and 208 to enter or process financial information 218, 220, respectively.

In processing this financial information, the systems coordinate with the business intelligence system 170 to reconcile the data. Similar to the embodiments described above, the first system 202 sends data 230 (including the key) to the second system 204, where the second system verifies the key included in the data and sends the second system's key and data 232 to the reconciliation device 106 in the business intelligence system 170.

The business intelligence device 170 performs reconciliation operations similar to the embodiments described above, including the description relating to FIGS. 4 and 5. When the computation device 110 has reconciled the data, the financial data is provided to a settlement device 240. This device may be a separate system, such as a clearinghouse for example, or may be associated with the first system 202 or the second system 204. The settlement device 240 is illustrated including communication with a server 242 and a portal computing device 244 providing a user 246 an output of the settlement operation.

Through the processing technique and the utilization of keys between first and second processing systems, also referred to as sending and receiving systems, the business intelligence system may be able to more quickly and accurately reconcile the financial data. This reconciliation is further enhanced by the key-based data selection and the ability to parse out non-reconciled data, thereby avoiding delaying the reconciliation of a full data set based on the non-reconciliation of a limited number of data elements. The system further includes additional operations for later settling of this non-reconciled financial data, including archiving the financial further reconciliation operations at later time intervals or otherwise returning the non-reconciled financial data back the sending device. Therefore, the business intelligence system provides customized efficient financial data settling operations.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. A computer-implemented method for efficiently reconciling business intelligence data, the method comprising:
    transmitting a first key and a first data set of financial data from a first device in a first financial processing system to a second device in a second financial processing system and to a reconciliation device via a network;
    receiving, by the reconciliation device from the second device in via the network, a second key and a second data set of financial data, wherein the first data set and the second data set of financial data each comprise individual data fields representing specific financial transactions, wherein the second key is the output of a verification of the first key against a device key stored in the second device, and wherein each of the first key and the second key is a hash value generated from the financial data of the first data set and the second data set respectively;
    selecting, by the reconciliation device executed by a processor of a business intelligence system, the first data set and the second data set based on the first key and the second key;
    selecting a comparison option from a plurality of comparison options, the plurality of comparison options including a first option for comparing aggregated total values of the first data set and the second data set and a second option for comparing the first data set and the second data set on an individual data field basis;
    comparing, by a computation device executed by the processor of the business intelligence system, the financial data of the first data set to the financial data of the second data set according to the selected comparison option; and
    if the compared financial data of the first data set is the inverse of the corresponding financial data of the second data set, reconciling the compared financial data of the first data set and the corresponding financial data of the second data set.

2. The method of claim 1 further comprising:
    if the first data set does not match the second data set, comparing the financial data of the first data set to the financial data to the second data set;
    reconciling financial data of the first set and financial data of the second set that match; and
    designating non-reconcilable financial data of the first set and financial data of the second set.

3. The method of claim 2 further comprising:
    archiving the financial data in a storage device.

4. The method claim 3 further comprising:
    after a defined period of time, deleting all financial data from a central processing device and retrieving the non-reconcilable financial data from the storage device.

5. The method of claim 4 further comprising:
    receiving the first key and a third data set of financial data from the first device in the first financial processing system;
    receiving, from the second device in the second financial system, the second key and a fourth data set of financial data; and
    comparing the financial data of the third data set to the financial data of the fourth data set and the non-reconcilable financial data.

6. The method of claim 1 further comprising:
    if the first data set does not match the second data set, comparing the financial data of the first data set to the financial data to the second data set;
    reconciling financial data of the first set and financial data of the second set that match; and
    providing the non-reconciled data of the first data set to the first device.

7. The method of claim 1 wherein the second data set is a negative value of the first data set.

8. The method of claim 1 wherein the first data set and second data set are received from financial processing systems and received within a business intelligence system.

9. An apparatus for reconciling business intelligence data comprising:
    a memory device having executable instructions stored therein; and
    a processing device, which when executing the stored executable instructions, performs a method to:
        receive a first key and a first data set of financial data from a first device in a first financial processing system via a network;
        receive, from a second device in a second financial system via the network, a second key and a second data set of financial data, wherein the first data set and the second data set of financial data each comprise individual data fields representing specific financial transactions, wherein the second key is the output of a verification of the first key against a device key stored in the second device, wherein the second device receives the first key and the first data set of financial data from the first device via the network and performs the verification, and wherein each of the first key and the second key is a hash value generated from the financial data of the first data set and the second data set respectively;
        select the first data set and the second data set based on the first key and the second key;
        select a comparison option from a plurality of comparison options, the plurality of comparison options including a first option for comparing aggregated total values of the first data set and the second data set and a second option for comparing the first data set and the second data set on an individual data field basis;

compare the financial data of the first data set to the financial data of the second data set according to the selected comparison option; and if the compared financial data of the first data set is the inverse of the corresponding financial data of the second data set, reconcile the compared financial data of the first data set and the corresponding financial data of the second data set.

10. The apparatus of claim 9, wherein if the first data set does not match the second data set, the processing device further:

compares the financial data of the first data set to the financial data to the second data set;

reconciles financial data of the first set and financial data of the second set that match; and designates non-reconcilable financial data of the first set and financial data of the second set.

11. The apparatus of claim 10 further comprising:
a storage device;
wherein the processing device, coupled to the storage device, archives the financial data in the storage device.

12. The apparatus claim 11, the processing device, after a defined period of time, deletes all financial data from a central processing device and retrieves the non-reconcilable financial data from the storage device.

13. The apparatus of claim 12, wherein the processing device further:

receives the first key and a third data set of financial data from the first device in the first financial processing system;

receives, from the second device in the second financial system, the second key and a fourth data set of financial data; and compares the financial data of the third data set to the financial data of the fourth data set and the non-reconcilable financial data.

14. The apparatus of claim 9, wherein if the first data set does not match the second data set, the processing device further:

compares the financial data of the first data set to the financial data to the second data set;

reconciles financial data of the first set and financial data of the second set that match; and provides the non-reconciled data of the first data set to the first device.

15. The apparatus of claim 9 wherein the second data set is a negative value of the first data set.

16. The apparatus of claim 9, wherein the first data set and second data set are received from financial processing systems and the processing device is disposed within a business intelligence system.

17. A business intelligence system comprising:

a reconciliation device that receives a first key and a first data set of financial data from a first device in a first financial processing system via a network and that receives a second key and a second data set of financial data from a second device in a second financial system via the network, wherein the first data set and the second data set of financial data each comprise individual data fields representing specific financial transactions, wherein the second key is the output of a verification of the first key against a device key stored in the second device, wherein the second device receives the first key and the first data set of financial data from the first device via the network and performs the verification, and wherein each of the first key and the second key is a hash value generated from the financial data of the first data set and the second data set respectively; and a computation device that:

selects a comparison option from a plurality of comparison options, the plurality of comparison options including a first option for comparing aggregated total values of the first data set and the second data set and a second option for comparing the first data set and the second data set on an individual data field basis;

selects the first data set and the second data set based on the first key and the second key;

compares the financial data of the first data set to the financial data of the second data set according to the selected comparison option; and reconciles the compared financial data of the first data set to the corresponding compared financial data of the second data set if the compared financial data of the first data set is the inverse of the corresponding financial data of the second data set.

18. The business intelligence system of claim 17 further comprising:

a difference device that receives non-reconciled financial data of the first and second data sets such that non-reconciled financial data is provided back to the reconciliation device; and a storage device that archives the financial data.

19. The business intelligence system of claim 17 further comprising:

a workflow device coupled to the computation device that receives non-reconciled financial data of the first data set and provides the non-reconciled financial data to the first device.

20. The business intelligence system of claim 17 wherein the first device is a first financial processing system and the second device is a second financial processing system, the first and second financial processing systems in communication with the business intelligence system.

* * * * *